June 29, 1943.  E. HAZELL  2,323,132
METHOD OF MANUFACTURING RUBBER THREAD
Filed Oct. 17, 1940
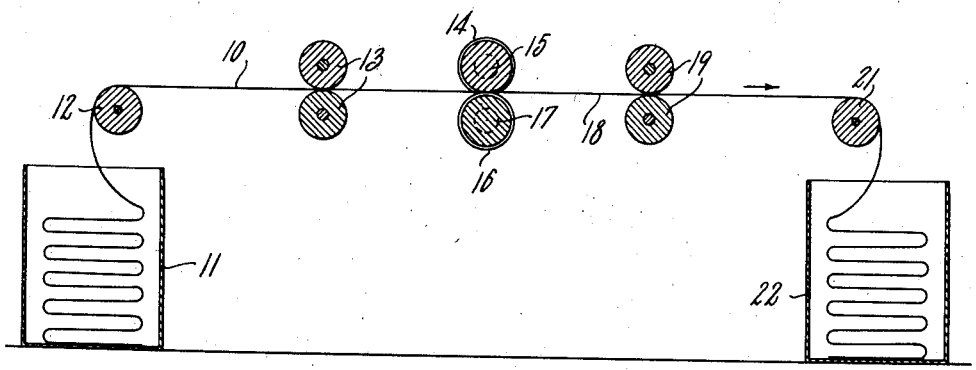
Fig. 1
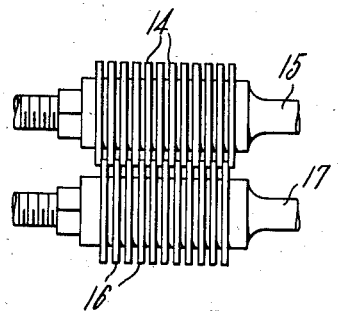
Fig. 2
Fig. 3
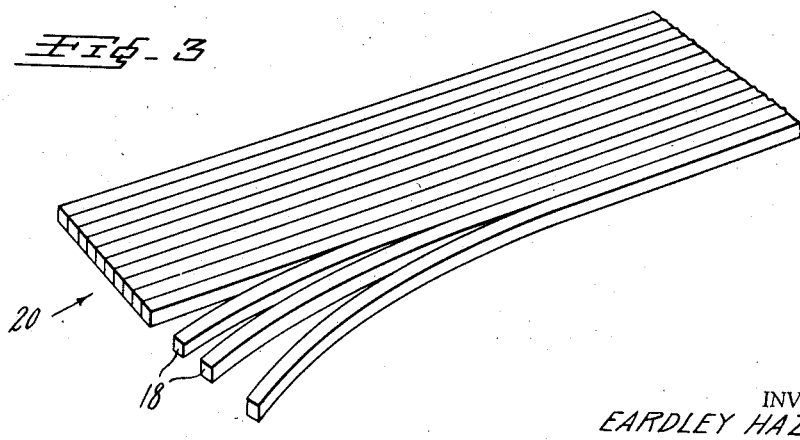
INVENTOR.
EARDLEY HAZELL
BY Lester G. Budlong
ATTORNEY Patented June 29, 1943

2,323,132

UNITED STATES PATENT OFFICE 2,323,132

METHOD OF MANUFACTURING RUBBER THREAD

Eardley Hazell, North Kingstown, R. I., assignor to United States Rubber Company, New York, N. Y., a corporation of New Jersey Application October 17, 1940, Serial No. 361,586

4 Claims. (Cl. 18—54)

This invention relates to a method of forming a series of vulcanized cut rubber threads temporarily into a sheet or ribbon to facilitate further processing and handling of the threads, and to the resulting ribbon.

It has been proposed heretofore to secure unvulcanized cut latex threads side by side in the form of a ribbon to facilitate handling, but when the threads are secured together before they are vulcanized it is difficult to prevent these threads from becoming completely amalgamated into an integral sheet during the subsequent vulcanizing period.

Therefore it has been proposed heretofore to introduce a tack reducing substance between the adjacent faces of the freshly cut unvulcanized threads to prevent them from becoming too firmly bonded together during the vulcanizing operation, but it is difficult to regulate the use of the tack reducing substance so as to secure the proper strength of bond between the threads. It is important, when the rubber threads are to be temporarily united in the form of a ribbon that the bond between the adjacent threads be strong enough to hold the ribbon intact during handling but that the bond be not strong enough to cause the threads to break as the ribbon is separated into its component threads.

The present invention therefore contemplates a simple method whereby rubber threads may be cut from a sheet of fully vulcanized rubber such as ordinary masticated, vulcanized thread sheet, and then reunited to form a ribbon or sheet to facilitate handling of the cut threads. The invention further contemplates a method whereby this desired result is secured without the use of any extraneous adhesive or adhesive forming substance, and without the use of any tack destroying substance such, for example, as talc.

The present result is secured by employing the inherent cohesive action of the clean, freshly cut faces of dry vulcanized rubber threads, when forced into intimate contact one with the other, to provide a sufficient bond between the threads to hold them in the ribbon or sheet formation. By employing the present method it is possible to secure vulcanized rubber threads together after they are cut from the sheet of thread stock without the use of any added adhesive, and to obtain a sufficient bond between the threads to hold the ribbon intact during its subsequent handling, without the danger of securing the threads so firmly together that they cannot be later separated.

In accordance with the present invention a vulcanized sheet of masticated rubber or other dry vulcanized rubber sheet is cut into a series of threads, preferably so that the threads lie side by side in sheet-like formation with their freshly cut surfaces facing one another, and while supported in this position in abutting or substantially abutting relation they are subjected to sufficient pressure to expand them laterally and force their faces together and cause them to cohere one to the other.

In this way a sufficient bond is formed between the adjacent threads to hold them in the desired ribbon formation. The strength of the bond may be controlled to a substantial degree by varying the degree of uniting pressure exerted upon the threads and the temperature of the threads at this time, and also by varying the degree of vulcanization of the threads and freshness of the cut faces at the time the threads are united.

The above and other features of the invention will be more fully understood from the following description when read in connection with the accompanying drawing showing one form of mechanism for carrying out the method.

In the drawing:

Fig. 1 is a longitudinal sectional view, shown more or less diagrammatically, of mechanism for carrying out the present method;

Fig. 2 is a front view of a pair of thread cutting rolls of the slitting disc type; and Fig. 3 on a larger scale is a perspective view of a ribbon of cut threads such as herein contemplated, some of the threads being shown as pulled away from the ribbon.

In the construction shown in Fig. 1 of the drawing the vulcanized sheet 10 of masticated rubber, such for example, as has been used for years as thread forming sheet stock, or other form of dry vulcanized sheet rubber, is drawn upwardly from any suitable source of supply such as the bin 11 in which the sheet may be folded back and forth as shown.

The rubber sheet 10 upon leaving the source of supply in the bin 11 passes upwardly about a roll 12 which is preferably driven, and then passes between a pair of driven pinch rolls 13. Upon leaving these rolls it passes to thread cutting means such as the banks of spaced slitting discs 14 mounted upon the supporting and operating shaft 15 and discs 16 mounted upon the supporting and operating shaft 17. These discs operate with a scissor action to cut the sheet.

The cut threads 18 produced from the sheet 10 upon leaving the cutting means just described and while still in abutting or substantially abutting relation pass between the power driven pressure rolls 19. The pairs of rolls 13 and 19 control the tension and advancing movement of the sheet 10 during the cutting operation. The rolls 19 also perform another important function in that by squeezing the threads 18 passing between them they cause these threads to spread laterally to thereby force their freshly cut abutting faces into intimate contact one with the other to cause the threads to cohere and form the desired ribbon 20.

In order that the threads 18 may cohere firmly one to the other it is important that the freshly cut faces be clean and free from talc or the like. Therefore the sheet 10 should be free or relatively free from talc or other tack destroying substances and the threads preferably should be dry when they are united. The slitting disc cutters shown are well adapted to cut the rubber sheet dry, although other types of cutters may be employed.

The threads 18 upon leaving the rolls 19 will be stuck together in the form of the sheet or ribbon 20. The ribbon may then pass over the feed roll 21 and into the bin 22, or may be delivered to other means for further processing, storage or handling. The strength of the cohesive bond between the cut faces of the threads can be varied to a considerable degree by, (1) regulating the degree of vulcanization of the sheet 10, (2) regulating the pressure exerted upon the cut threads 18 by the rolls 19, (3) varying the time that elapses after the sheet 10 is vulcanized before it is cut into thread and (4) by heating the pressure rolls 19 to different temperatures.

It will be seen from the foregoing that the present method provides an extremely simple way of securing the cut vulcanized threads together into a ribbon to facilitate handling, and that this is accomplished without the need of supplying an extraneous adhesive, also that the present method overcomes the danger of bonding the threads so firmly together that they cannot be later separated.

The threads 18 while bonded together may be handled as a ribbon for further processing, as inspection, spooling and shipping, and then may be separated again into the individual threads by drawing them through a reed or by employing other means to force the threads apart.

While rubber threads have been herein shown and described, it will be apparent that the invention is equally adapted for use in connection with narrow rubber strips such as are used in forming golf balls.

Having thus described my invention, what I claim and desire to protect by Letters Patent is:

1. The method of manufacturing cut rubber threads or strips which comprises, cutting from a fully vulcanized sheet of masticated rubber a series of threads or strips, supporting these vulcanized threads or strips side by side with their cut faces clean and in abutting contacting relation, exerting pressure upon these threads or strips to thereby expand them laterally sufficiently to force the cut faces together and reunite the vulcanized threads or strips solely by the inherent cohesive action between the cut faces, and thereby form a ribbon in which the bond between the threads or strips is sufficient to hold them in ribbon formation during handling.

2. The method of manufacturing cut rubber threads or strips which comprises, cutting from a vulcanized sheet of masticated rubber a series of threads or strips, supporting these vulcanized threads or strips side by side with their cut faces clean and in abutting contacting relation, pressing these vulcanized threads or strips together to cause an intimate engagement between their cut faces and thereby unite them solely by the inherent cohesive action between their cut faces, and thereby form a ribbon in which the bond between the threads or strips is sufficient to hold them in ribbon formation during handling but permits separation of the threads or strips without breakage.

3. The method of manufacturing cut rubber threads or strips which comprises, cutting simultaneously from a vulcanized sheet of masticated rubber a number of threads or strips and supporting them in side by side relation with their freshly cut faces clean and in abutting contacting relation, reuniting these threads or strips as they advance from the cutting position by exerting sufficient pressure upon them to expand them laterally and force their cut faces firmly together to cause them to stick together solely by the inherent cohesive action between the cut faces, and thereby form a ribbon in which the bond between the threads or strips is sufficient to hold them in ribbon formation during handling.

4. The method of manufacturing cut rubber threads or strips which comprises, cutting simultaneously from a vulcanized sheet of masticated rubber a number of threads or strips and supporting them in side by side relation with their freshly cut faces clean and in abutting contacting relation, reuniting these threads or strips as they advance from the cutting position by exerting sufficient pressure upon them to expand them laterally and force their cut faces firmly together and at the same time subject them to the action of heat to cause them to stick together solely by the inherent cohesive action between the cut faces, and thereby form a ribbon in which the bond between the threads or strips is sufficient to hold them in ribbon formation during handling.

EARDLEY HAZELL.